July 6, 1965   R. M. VOITIK ETAL   3,193,298
CARTRIDGE TYPE FACE SEAL
Filed Aug. 17, 1961
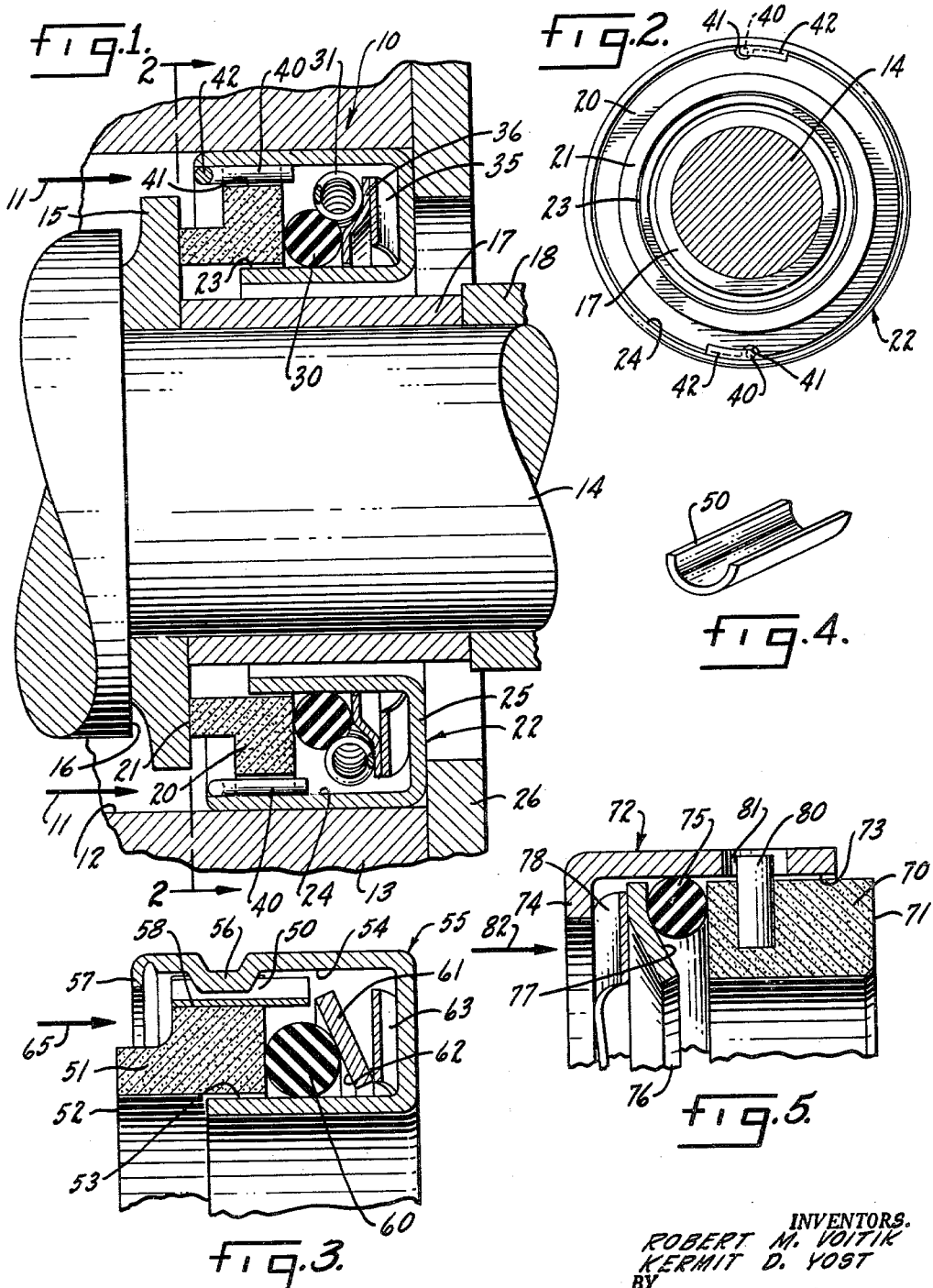
INVENTORS.
ROBERT M. VOITIK
KERMIT D. YOST
BY
Wolfe, Hubbard, Voit & Osann
ATTORNEYS.

United States Patent Office 3,193,298
Patented July 6, 1965

3,193,298
CARTRIDGE TYPE FACE SEAL
Robert M. Voitik, Evanston, and Kermit D. Yost, Skokie, Ill., assignors to Continental Illinois National Bank and Trust Company, as trustee under the Cartridge Type Seal Liquidation Trust
Filed Aug. 17, 1961, Ser. No. 132,035
2 Claims. (Cl. 277—40)

This invention relates to rotary seals and more particularly concerns an improved cartridge type face seal construction.

It is the primary aim of the invention to provide a cartridge type face seal which is more economical to manufacture than prior seals of this type but which operates with no loss in sealing efficiency. It is also an object of the invention to provide an improved seal of the above type which replaces conventional seal constructions without requiring modification of the sealed parts.

More specifically, it is an object to provide a seal as characterized above which utilizes a simple, low cost stator configuration and which permits the stator sealing face to be lapped prior to assembly so as to further reduce manufacturing cost. Another object is to provide a seal of the above description which reduces the critical tolerance relationship between stator and cartridge case found in conventional seals of this type and which eliminates at least one machining operation on the case.

A further object is to provide an improved arrangement for anchoring a stator against rotation relative to the stator case. In greater detail, it is an object to provide a seal in which stator "hang-up" is avoided and which permits rapid and convenient removal of the stator from its case for inspection or servicing. A related object is to provide a seal of the above character in which the stator is locked in its case and anchored against rotation without machining the case for this purpose or interrupting the periphery of the case.

Other objects and advantages of the invention will become apparent upon reading the following detailed description and upon reference to the drawings, in which:

FIGURE 1 is a fragmentary longitudinal section of a rotary shaft assembly including a seal constructed in accordance with the invention;

FIG. 2 is a reduced fragmentary section taken approximately along the line 2—2 in FIG. 1;

FIG. 3 is a fragmentary section of a modified form of seal also embodying the invention;

FIG. 4 is a perspective of an insert used in the seal construction shown in FIG. 3; and FIG. 5 is a fragmentary section of a further modification which also embodies the invention.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Turning first to FIG. 1, there is shown a rotary shaft assembly including a rotary seal 10 constructed in accordance with the invention. The seal 10 restricts fluid leakage in the direction of the arrows 11 through an opening 12 between a housing 13 and a relatively rotatable shaft 14. The seal 10 is of the face seal type and includes a rotor 15, locked to the shaft 14 against a shoulder 16 by sleeves 17 and 18, which cooperates with an annular stator 20 having a flat, lapped sealing surface 21 that engages the rotor 15.

The stator 20 is mounted in a cartridge case 22 which is an annular unit having opposed inner and outer cylindrical walls 23 and 24, respectively, between which the stator is loosely fitted. Preferably, the case 22 is formed as a single piece with an integral annular portion 25 spacing the opposed walls 23, 24. The case 22 thus permits the stator portion of the seal 10 to be handled as a unit and encloses and protects those elements of the seal which cooperate with the annular stator 20. The case 22 is sealed in the opening 12 and locked in place by a plate 26 which is secured to the housing 13.

In accordance with one aspect of the invention, a resilient sealing member preferably in the form of an O-ring 30 is fitted about the wall 23 adjacent the stator 20, and the O-ring 30 is firmly pressed both against the wall 23 and the stator so as to bias the sealing surface 21 against the rotor 15 and also provide a seal between the stator and the case 22. For pressing the O-ring 30 against the inner wall 23, a garter spring 31 is expanded about the O-ring so as to exert a compressive force squeezing the O-ring about the inner cylindrical wall 23. In the illustrated construction, the garter spring 31 is formed of a length of helical spring having its ends secured together to form an annular unit.

To urge the O-ring 30 against the stator 20, an annular wave spring 35 is interposed between the case portion 25 and the O-ring 30. In the illustrated construction, an annular washer 36 is interposed between the wave spring 35 and the O-ring 30 so as to transmit the force of the wave spring 35 to the O-ring and also guide the garter spring 31 against the O-ring.

The O-ring 30 provides a floating mounting for the stator 20 with there being an effective seal between the stator and the case 22 by reason of the firm engagement of the O-ring 30 with both the stator 20 and the inner cylindrical wall 23 of the case 22. It will be noted that this seal between the stator and the case 22 is not dependent upon the maintenance of a critical dimensional relationship or tolerance between the stator 20 and the case 22. Indeed, those skilled in the art will recognize that the conformation of the stator 20 is particularly simple as compared with more conventional stator constructions. Moreover, no critical machining of the case 22 is required since the O-ring 30 is compressed by the garter spring 31 into positive sealing engagement with the case.

The O-ring 30 also cushions and evenly distributes the force of the relatively stiff wave spring 35 to the stator 20. Thus, the stator sealing surface 21 can be finished and lapped prior to assembly within the case 22 and there is no need to first assemble the unit and then lap the sealing surface as is the case when a non-resilient, positive mechanical connection is provided between a stator and its biasing spring. This materially simplifies and lessens the cost of manufacture of the seal 10.

In keeping with the invention, the stator 20 and the case 22 are locked against relative rotation, and the stator is held in the case, by a wire 40 secured in axially disposed relation to the outer wall 24 that is received by a notch 41 formed in the outer periphery of the stator 20. Preferably, two notches 41 and wires 40 are disposed on opposite sides of the stator. As will be evident, the wires 40 thus form lugs which key the stator 20 to the surrounding case 22 and positively prevent relative rotation.

In the illustrated construction, the wires 40 extend the full length of the stator 20 so that the stator cannot twist slightly and "hang up," that is, become jammed against axial movement under the force of the spring 35. The outer ends 42 of the wires 40 are left unsecured to the case 22 and are bent at angles to the notches 41 so as to block movement of the stator from the case 22. Thus, the wires 40 not only prevent relative rotation between the stator 20 and the surrounding case 22, but also lock the stator within the case.

It will be appreciated that the wires 40 make unnecessary any machining of the case 22 to turn down an outer edge for the purpose of holding the stator within the cartridge case. It can also be seen that the periphery of the case is left in uninterrupted, substantially cylindrical form so that a good seal is maintained between the case 22 and the housing 13 within which the case is mounted. Disassembly of the stator 20 from the case 22 for inspection or servicing of the seal is quite easy since by bending the ends 42 of the wires 40 outwardly of the case 22, the stator 20 can be easily slipped from the case. Replacing the stator and again bending the ends 42 of the wires 40 relocks the stator within the case.

As a feature of the invention, a metallic semicylindrical insert 50 can be interposed between the stator notch and the case keying lug so as to avoid chipping or other damage of the stator material (see FIGS. 3 and 4). In this modification, a stator 51 having a sealing surface 52 is mounted between inner and outer walls 53 and 54, respectively, of a cartridge case 55. The stator 51 is locked against rotation within the case 55 by a lug 56 formed by depressing a portion of the outer wall 54, and the stator is held within the case 55 by a turned down lip 57 at the end of the outer wall 54. Those skilled in this art will recognize this case configuration as being conventional.

The semicylindrical insert 50 is fitted into a notch 58 formed in the periphery of the stator 51 so that the insert receives the lug 56 and constitutes a protective liner for the notch 58. The stator 51, formed of a frangible material such as carbon, is thus protected against digging in or chipping by the lug 56 during operation of the seal.

As an important modification of the invention, the stator 51 is biased outwardly of the case 55, and is sealed to the wall 53, by a resilient sealing member in the form of an O-ring 60 that is sandwiched between the stator 51 and annular washer 61 having a conical surface 62 which faces both the stator 51 and the wall 53. An annular wave spring 63 bears on the washer 61 and urges it axially against the O-ring 60.

Under the urging of the spring 63, the conical surface 62 exerts a camming force tending to compress the O-ring 60 into snug sealing engagement with the case wall 53. The washer 61 also transmits the relatively strong force of the spring 63 to the stator 51 thereby providing a seal between the O-ring and the stator as well as creating a sealing force to be transmitted through the sealing surface 52. It will be apparent that the features and advantages of this assembly are identical to those described above in connection with the modification of FIGS. 1 and 2, with the FIG. 3 modification having the additional advantages resulting from the elimination of the garter spring 31.

The FIG. 3 seal is intended to function with pressure moving against the seal in the direction of the arrow 65 and thus the pressure tends to seat the O-ring 60 more firmly against the inner wall 53 of the case 55. If pressure is received by the seal in the opposite direction, there is a tendency to "blow out" the O-ring 60 and for the purpose of effectively sealing such reverse pressure, the inverted seal construction shown in FIG. 5 is provided.

With reference to the FIG. 5 modification, a stator 70 having a sealing surface 71 is mounted within a case 72 formed with a cylindrical wall 73 and a rear inturned portion 74. A resilient sealing member in the form of an O-ring 75 is positioned adjacent the wall 73 and is sandwiched between the stator 70 and a washer 76 having a conical surface 77 facing both the stator 70 and the wall 73. An annular wave spring 78 is compressed between the washer 76 and the case portion 74 so as to exert a relatively strong force against the washer 76 axially of the seal construction. As in the FIG. 3 modification, the conical surface 77 cams the O-ring 75 into sealing engagement with the wall 73 and also transmits the force of the spring 78 to the stator 70.

To lock the stator 70 within the case 72 and prevent relative rotation between the stator and the case, a pin 80 is seated in the stator 70 and extended into a slot 81 formed in the wall 73 of the case 72.

It will be apparent that the inverted FIG. 5 modification functions in the same manner as the modification shown in FIG. 3. However, with pressure moving in the direction of the arrow 82, the reverse direction relative to the seal to that shown in the FIG. 3 embodiment, the pressure tends to seat the O-ring 75 more firmly against the stator 70 and the case wall 73 and thus there is no danger of seal "blow out."

We claim as our invention:

1. A rotary seal assembly comprising, in combination, an annular cartridge case defining a cylindrical wall, an annular stator loosely positioned adjacent said wall and within said case, said stator formed of a frangible material and having a sealing surface adapted to extend from said case, said wall having a lug, said stator having a notch receiving said lug so as to lock the stator and said case against relative rotation, and a metallic semicylindrical insert interposed between said lug and said notch to prevent chipping of said stator.

2. A rotary seal assembly comprising, in combination, an annular cartridge case defining opposed inner and outer cylindrical walls, an annular stator loosely fitted between said walls within said case, said stator formed of a frangible material and having a sealing surface adapted to extend from said case, said outer wall having a lug, said stator having a notch receiving said lug so as to lock the stator and said case against relative rotation, a metallic semicylindrical insert interposed between said lug and said notch to prevent chipping of said stator, an annular resilient sealing member fitted about said inner cylindrical wall within said case and adjacent said stator, an annular washer sandwiching said sealing member between the washer and said stator, said washer having a conical surface facing both said stator and said inner wall and engaging said sealing member, and means urging said washer against said sealing member so as to bias said sealing surface outwardly of said case and provide a seal between said stator and the case.

References Cited by the Examiner

UNITED STATES PATENTS

| | | | |
|---|---|---|---|
| 1,950,852 | 3/34 | Kuehn et al. | 277—96 XR |
| 2,399,764 | 5/46 | Schilling | 277—86 |
| 2,593,899 | 4/52 | Krug | 277—38 |
| 2,871,039 | 1/59 | Payne | 278—87 X |
| 2,871,040 | 1/59 | Payne | 277—41 |
| 2,889,159 | 6/59 | Jensen | 277—38 |
| 3,013,823 | 12/61 | Schulz | 277—38 |

FOREIGN PATENTS

| | | |
|---|---|---|
| 1,073,566 | 3/54 | France. |

LEWIS J. LENNY, *Primary Examiner.*

SAMUEL ROTHBERG, EDWARD V. BENHAM,
*Examiners.*